Figure 9:
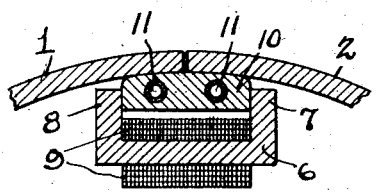

Feb. 13, 1934.  E. CHAPMAN  1,947,077
ARC WELDING
Filed April 30, 1930  2 Sheets-Sheet 1
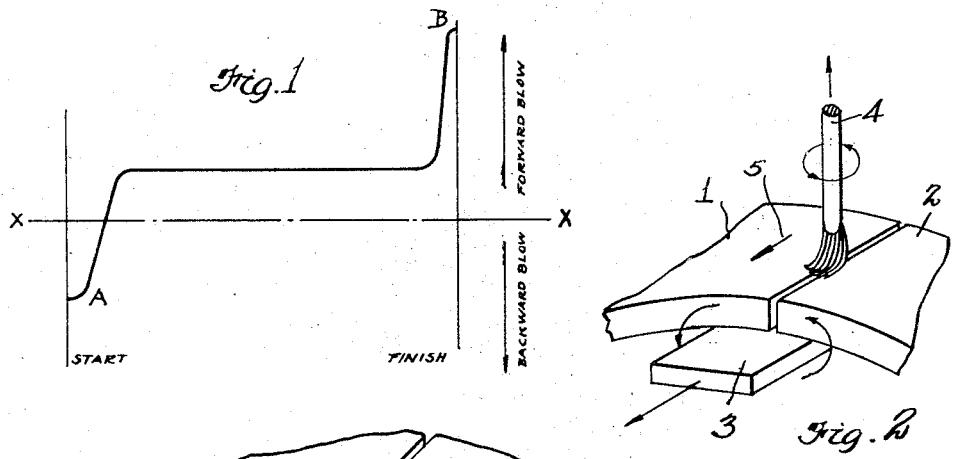
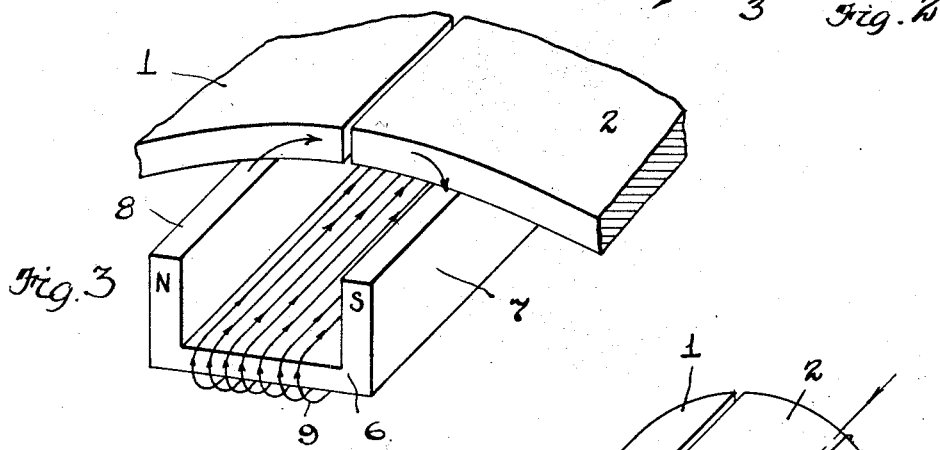
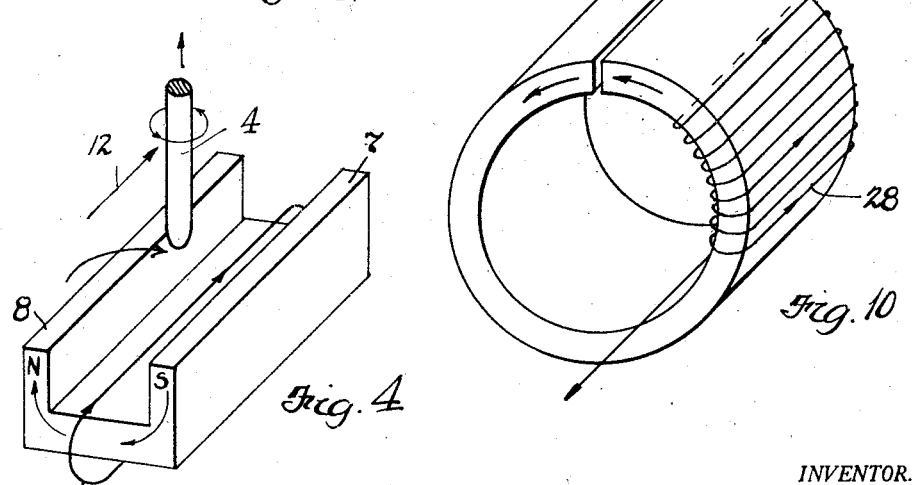
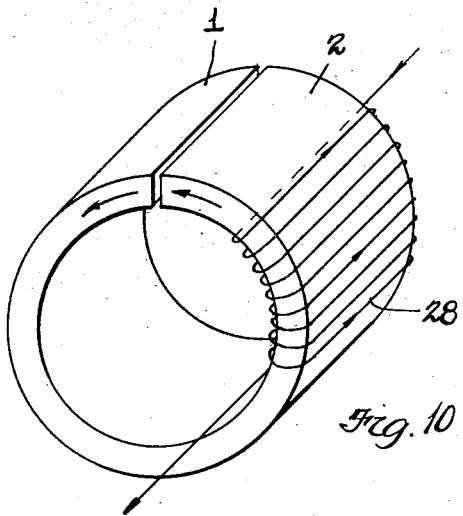
INVENTOR.
Everett Chapman
BY
Fay Oberlin & Fay
ATTORNEYS Feb. 13, 1934. E. CHAPMAN 1,947,077
ARC WELDING
Filed April 30, 1930  2 Sheets-Sheet 2

INVENTOR.
Everett Chapman
BY
Fay, Oberlin & Fay
ATTORNEYS.

UNITED STATES PATENT OFFICE 1,947,077

ARC WELDING

Everett Chapman, Cleveland, Ohio, assignor to
The Lincoln Electric Company, Cleveland,
Ohio, a corporation of Ohio Application April 30, 1930. Serial No. 448,756

3 Claims. (Cl. 219—10)

This invention, relating as indicated to arc welding, has specific reference to a method of and apparatus for use in connection with electric arc welding, and particularly applicable to the control of the welding arc in order to produce a seam of superior quality.

When electric welding is carried on by means of so-called automatic machines in which the electrode is supported by a movable head which is caused to travel longitudinally of the seam, the arc as struck between the welding electrode, which may be a carbon pencil, and the work, is inclined to be erratic in its behavior in following along the seam. Various means have been suggested in the prior art for controlling the blow of the arc so that the intensity thereof may be localized on the seam to be welded and, further, that the rate of travel of the arc may be uniform as compared to the movement of the welding electrode longitudinally of the seam. One of the undesirable characteristics in the behavior of the welding arc is its tendency to move by jerks along the seam, even though the welding electrode is moved at a uniform rate of speed. The intermittent movement of the arc is due primarily to its tendency to seek out the area of least resistance; hence, in travelling over the seam cleft, which in most cases is somewhat uneven, the arc will have a tendency to localize on the high points of the seam, or at other points which offer the least resistance.

It is among the objects of my invention to provide a method of arc control which shall tend to move the arc longitudinally of the seam cleft, either in advance or in arrears of the welding electrode, the force of such control means being of such strength that the minor effects of the unevenness in the resistance and contour of the seam will have no effect on the arc travel.

A further disadvantage which has been experienced in connection with electric welding as carried on by so-called automatic machines, is that as the electrode moves up to the work the arc has a tendency to jump forward in advance of the electrode and play upon the terminal portion of the seam cleft for a period of time longer than normally required to effect a weld, and consequently, the metal is burned and otherwise deteriorated.

A further object of my invention is to provide a method of arc control which shall oppose any tendency on the part of the arc to jump to the work in advance of the welding electrode.

As the electrode approaches the end of the seam and moves off from the work, the arc has a tendency to lag behind the electrode and not leave the work soon enough, so that here again the metal adjacent the seam is subjected to the heat of the arc for a period longer than the normal time, which likewise results in an area of inferior quality.

A further object of my invention is to provide a method of arc control which will blow the arc off from the end of the work as the electrode passes therefrom. Other objects of my invention will appear as the description proceeds.

To the accomplishment of the foregoing and related ends, said invention, then, consists of the means hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

In said annexed drawings:—

Figure 6:
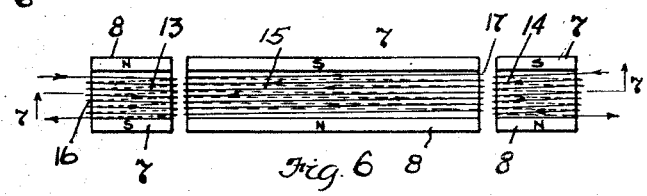
Figure 7:
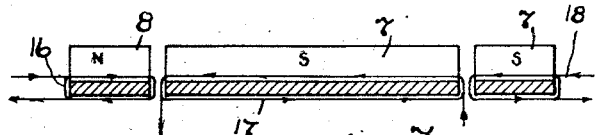
Figure 5:
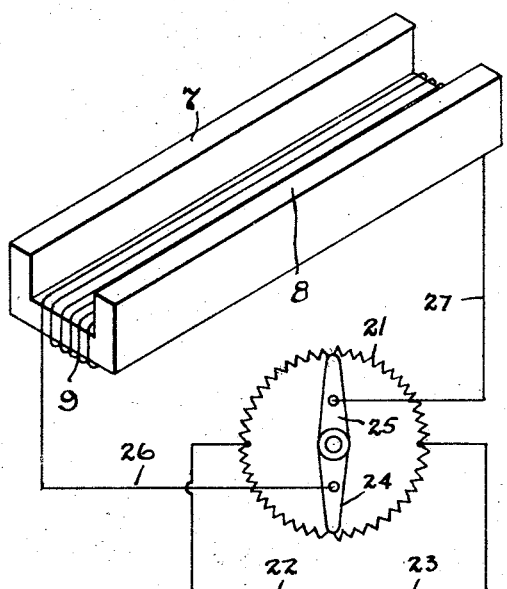
Figure 8:

Fig. 1 is a diagrammatic representation of the influence on the welding arc by the method comprising my invention; Fig. 2 is a fragmentary isometric view of two elements to be welded together, having associated therewith a backing strip and the welding electrode; Fig. 3 is a fragmentary isometric view of work elements positioned on an electro magnetic means, being one form of the device for accomplishing the method comprising my invention; Fig. 4 is an isometric view of the electro magnetic means shown in Fig. 3, having associated therewith diagrammatic representations of the welding electrode and the several flux fields; Fig. 5 is an isometric view of the electro magnetic means shown in Figs. 3 and 4, having associated therewith a diagrammatic representation of means for controlling the intensity of the flux field; Fig. 6 is an alternative form of construction showing in combination a plurality of electro magnetic means designed to be used in lieu of the means illustrated in the previous figures; Fig. 7 is a sectional view of mechanism shown in Fig. 6 taken on the plane substantially indicated by the line 7—7; Fig. 8 is a sectional view of an alternative form of construction of the mechanism illustrated in Figs. 6 and 7; Fig. 9 is a fragmentary transverse sectional view of work elements to be welded together, supported on one form of the electro magnetic means for carrying out the method of my invention; and Fig. 10 is an isometric view of a cylindrical article, having a longitudinal seam cleft to be welded, and having shown in association therewith a coil for producing a flux field across such seam cleft.

Referring more specifically to the drawings and more especially to Fig. 1, the diagram here illustrated is intended to show the forces to be exerted upon the welding arc as it travels throughout the length of the seam to be welded and, as hereinbefore stated, in order to properly control the arc as it enters upon and leaves the work, it is necessary to exert forces in opposite directions to accomplish this result. The forces required to accomplish this result are indicated by the line A—B, the position of which line with respect to the horizontal axis X—X denoting the magnitude and direction of the force to be exerted on the arc. As the arc is brought to the work the tendency of such arc to jump to the end of the work in advance of the electrode must be counteracted by a force which is here illustrated as of a negative 1.6 magnitude, as compared to the positive unity magnitude of force employed to blow the arc forwardly of the electrode as the electrode moves along the seam. The backward blow, that is the blow which tends to keep the arc from jumping to the work, being represented below the horizontal axis X—X, and the forward blow, which forces the arc in the opposite direction, being shown above the horizontal axis X—X. The magnitude of the forward blow required to move the arc off the end of the work as the electrode passes off from the end of the work, is here represented as positive 2.8 units of force, as compared to the positive unit of force normally employed to control the arc during the major portion of its travel over the work.

The values above given are merely illustrative of actual results obtained in experimental work to determine the amount of force, magnetic or otherwise, which is required to properly control the arc in its movement along the seam as well as its entering upon and leaving the work.

The blow of the arc longitudinally of the seam and somewhat away from the point immediately beneath the axis of the welding electrode, is accomplished in the manner illustrated in its most simple form in Fig. 2. In this figure the work elements 1 and 2 are brought into abutting or nearly abutting relationship and preferably rest upon a backing or fire strip 3. The welding electrode 4, which may be a carbon pencil, is brought into welding relation with the seam by the members 1 and 2 and moved along the seam by the automatic head or carriage. By passing an electric current through the fire strip or backing strip 3 in the direction indicated by the arrow in this figure, a flux field is produced, which flux will flow across the seam gap from the element 2 to the element 1. As the arc is struck between the welding electrode 4 and the seam cleft, such electrode carrying the welding current, will likewise set up a flux field which flows in the direction indicated by the arrows around the electrode. From an examination of this figure it will be noted that the flux field to the rear of the electrode as such electrode travels in the direction indicated by the arrow 5, will add to the flux field produced by the current flowing through the backing strip 3; whereas, the flux field of the electrode 4 to the front thereof will buck the flux field produced by the current in the strip 3. The flux field forwardly of the electrode 4 will therefore be of a much rarer density than the flux field to the rear of the electrode, and since the welding arc is forced away from the area of greatest density of flux, the arc will be blown forward in advance of the electrode 4, as it moves along the seam.

Instead of employing a current in the backing strip 3 to produce a flux across the seam cleft, which shall be the factor determining the blow of the arc, I may prefer to employ a U-shaped element 6, as illustrated in Fig. 3, which element has upwardly extending legs 7 and 8, formed integrally therewith. Around the base of the U-shaped element 6, as indicated in this figure, a plurality of coils 9 will be wound, which coils may have current flowing therethrough in the direction indicated by the arrows associated therewith. A fire strip 10 or backing strip may be placed intermediately of the upwardly directed legs 7 and 8, which will protect the coils 9 from injury during use, and which fire strip or backing strip 10 may have conduits 11 extending therethrough to receive a suitable cooling fluid so that the heat from the welding arc will not be transmitted to and injure the coil 9.

The flux fields, when the U-shaped element 6 is employed, and when the current in the coils 9 flows as indicated by the arrows, are most clearly shown in Fig. 4. With the current in the coils 9 as indicated, the leg 8 will become a north pole and the leg 7 will become a south pole, so that the flux will flow across the seam cleft from the member 1 to the member 2. The welding current being from the work to the electrode, the flux field set up by such current in the electrode 4 will be as indicated by the arrows around the electrode, which field is identical with that explained in connection with Fig. 2. The direction of movement of the electrode 4 with respect to the work in this figure is indicated by the arrow 12. As explined in connection with Fig. 2, the flux on the rear side of the electrode 4 will be of a greater intensity than the flux to the front of such electrode, so that here again the arc forced away from the area of greatest flux tensity will be blown forwardly of the electrode as it travels longitudinally of the seam.

As above stated, and as most clearly described in connection with Fig. 1, in order to prevent the welding arc from jumping to the work in advance of the welding electrode, it is necessary to set up a flux field which will oppose such movement of the arc and, likewise, in order to prevent the welding arc from lagging with the work after the electrode has moved therefrom, it is necessary to provide a flux field which will oppose such tendency on the part of the arc. To accomplish the above-named control of the arc, I may employ electro magnetic means such as illustrated in Figs. 6 and 7. In these figures three U-shaped elements, such as described in connection with Figs. 3 and 4, are employed, the end elements 13 and 14 being considerably shorter than the metal element 15. The U-shaped element 13 which, for the purpose of illustration, is that element adjacent the end of the work approached by the electrode, has coils wound thereon which carry an electric current opposite in direction to the coils wound on the elements 14 and 15. The direction of flow of the current in the coil 16 wound on the element 13 is such as to produce a backward blow of the magnitude illustrated in Fig. 1. The direction and magnitude of the current flowing in the coil 17, which is wound on the element 15, is such as to produce a direction and magnitude of blow of the arc, as illustrated by the flat middle portion of the line A—B in Fig. 1. The magnitude and direction of flow of the current in the coil 18 is such as to produce a magnitude and direction of blow of the arc, as illustrated by the terminal portion of the line A—B in Fig. 1 adjacent the end B. The direction of flow of the current in the coils 17 and 18, it will be noted, is the same so as to produce a field of flux in the same direction, the only difference being in the intensity of the flux fields set up by these coils. The coil 18 will produce a relatively stronger flux than the coil 17, since a stronger force is required to blow the arc off from the end of the work. The coil 16 carries a current which flows oppositely to that in the coils 17 and 18, so that the force exerted by the flux field of this coil is opposite in direction to the flux field of the coils 17 and 18, the reason for such opposite direction being hereinbefore explained in connection with Fig. 1.

Instead of employing separate elements, as 14 and 15, which have separate coils, as 18 and 17, respectively, I may form the electromagnetic means causing a forward blow of the arc as illustrated in Fig. 8, in which the upper surfaces of the legs 7 and 8 are cut away throughout the major portion of the seam length and only the terminal portion 19 thereof corresponding in length to the length of the element 14, contacting or nearly contacting with the work to be welded on opposite sides of the seam cleft. In this form of construction a single coil 20 may be employed instead of coils 17 and 18, the increased density of the flux field across the seam cleft being accomplished by reducing the arc gap by the projecting portion 19 of the north and south poles. In this form of construction, the element 13 will be retained to effect a backward blow of the arc to prevent its jumping onto the work in advance of the electrode.

Instead of employing a flux field producing means separated into separate elements, as illustrated in Figs. 6, 7 and 8, I may employ a single unit which may be similar to the U-shaped element 6 described in connection with Fig. 3, and which similarly has a coil 9 wound thereon in like manner. In order to secure the proper flux field to effect a backward and forward blow of the arc and also to vary the intensity of such flux field, I may employ a resistance 21 which is of the form illustrated in Fig. 5, and which is connected to the leads 22 and 23 of a direct current line. When the arms 24 and 25, which are respectively connected to the leads 26 and 27 of the coil 9, are in the position illustrated in this figure, no current will flow in the coil 9 since the magnitude of the resistance on each side of the arms 24 and 25 is the same, but when the arms 24 and 25 are moved from this position in either direction, a current will be permitted to flow in the coil 9, the magnitude and direction of such current depending upon the direction and amount of movement of the arms 24 and 25. In this manner, flux fields to effect the forward and backward blowing action on the arc, as illustrated in Fig. 1, may be obtained by the operator by simple manipulation of the arms 24 and 25 which, it will be noted, are rigidly secured together so that a movement of one of such arms effects a corresponding movement of the other.

A simple means by which a flux field can be produced across the seam cleft when hollow cylindrical or like articles are to be welded, as illustraated in Fig. 10, is to pass around the article to be welded a number of turns of current-carrying conductor so that the flux field thereof will be carried in the iron and flow across the seam cleft, depending upon the direction in which the coil 28 is wound, and also the direction of flow of the current therein.

A further description of the methhod and apparatus comprising my invention is believed unnecessary for those familiar with the art, suffice it to say that the theory upon which the blow of the arc depends and which has been explained in connection with Fig. 2, is applicable to any of the forms explained in the above description, so that a reiteration of this theory has been omitted in connection with each modification.

Other modes of applying the principles of my invention may be employed instead of the one explained, change being made as regards the means and the steps herein disclosed, provided those stated by any of the following claims or their equivalent be employed.

I therefore particularly point out and distinctly claim as my invention:

1. The method of electric arc welding which consists in presenting a suitable electrode in arcing relation to the work, relatively moving such work and electrode to cause the latter to follow the line to be welded, and directing the blow of the arc by establishing a flow of magnetic flux transversely of the direction of such relative movement, the intensity of such flux being greatest at the ends of the work than at intermediate points.

2. The method of electric arc welding which consists in presenting a suitable electrode in arcing relation to the work, relatively moving such work and electrode to cause the latter to follow the line to be welded, and directing the blow of the arc by establishing a flow of magnetic flux transversely of the direction of and throughout the entire length of such relative movement, the intensity of such flux being greater at the ends of the work than at intermediate points and in opposite directions at the ends of the work.

3. The method of electric arc welding which consists in presenting a suitable electrode in arcing relation to the work, relatively moving such work and electrode to cause the latter to follow the line to be welded, and directing the blow of the arc by establishing a flow of magnetic flux transversely of the direction of such relative movement and in opposite directions at the opposite ends of the work.

EVERETT CHAPMAN.